Sept. 1, 1970    S. S. STATA    3,526,016
SHOE SCRAPER FLOOR MAT AND LOCATING FRAME
COMBINATION FOR MOTOR VEHICLES
Filed Oct. 8, 1968    2 Sheets-Sheet 2
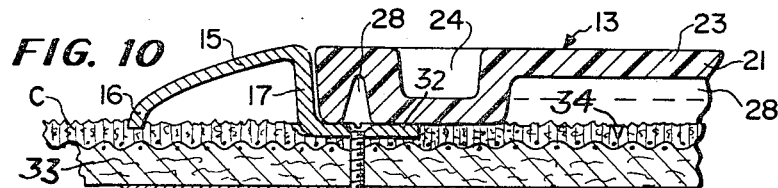
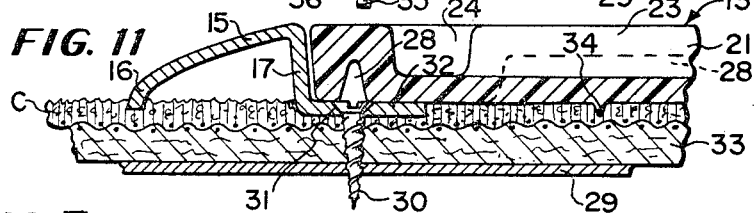
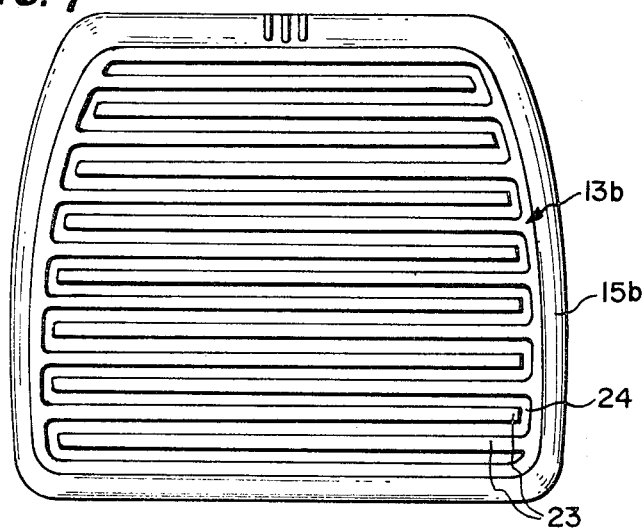
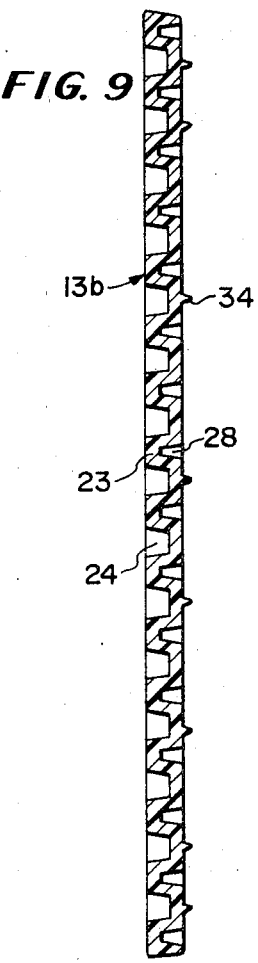
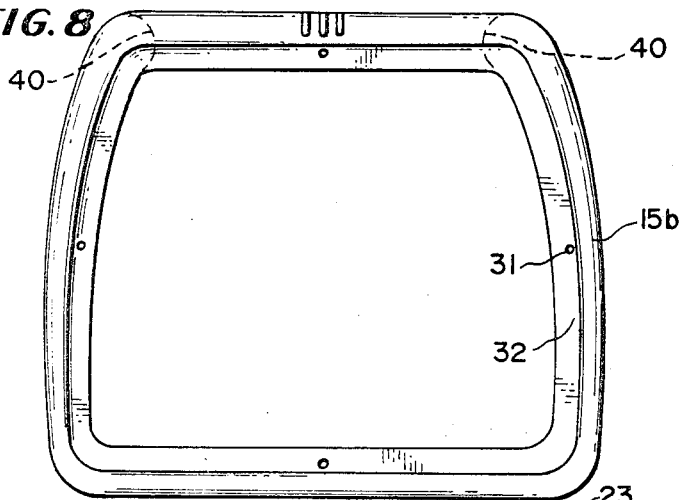
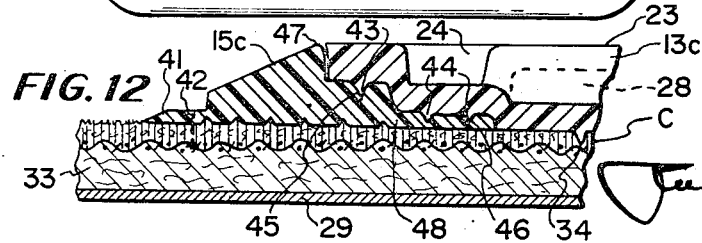
INVENTOR
STANLEY S. STATA
Attorney

# United States Patent Office 3,526,016
Patented Sept. 1, 1970

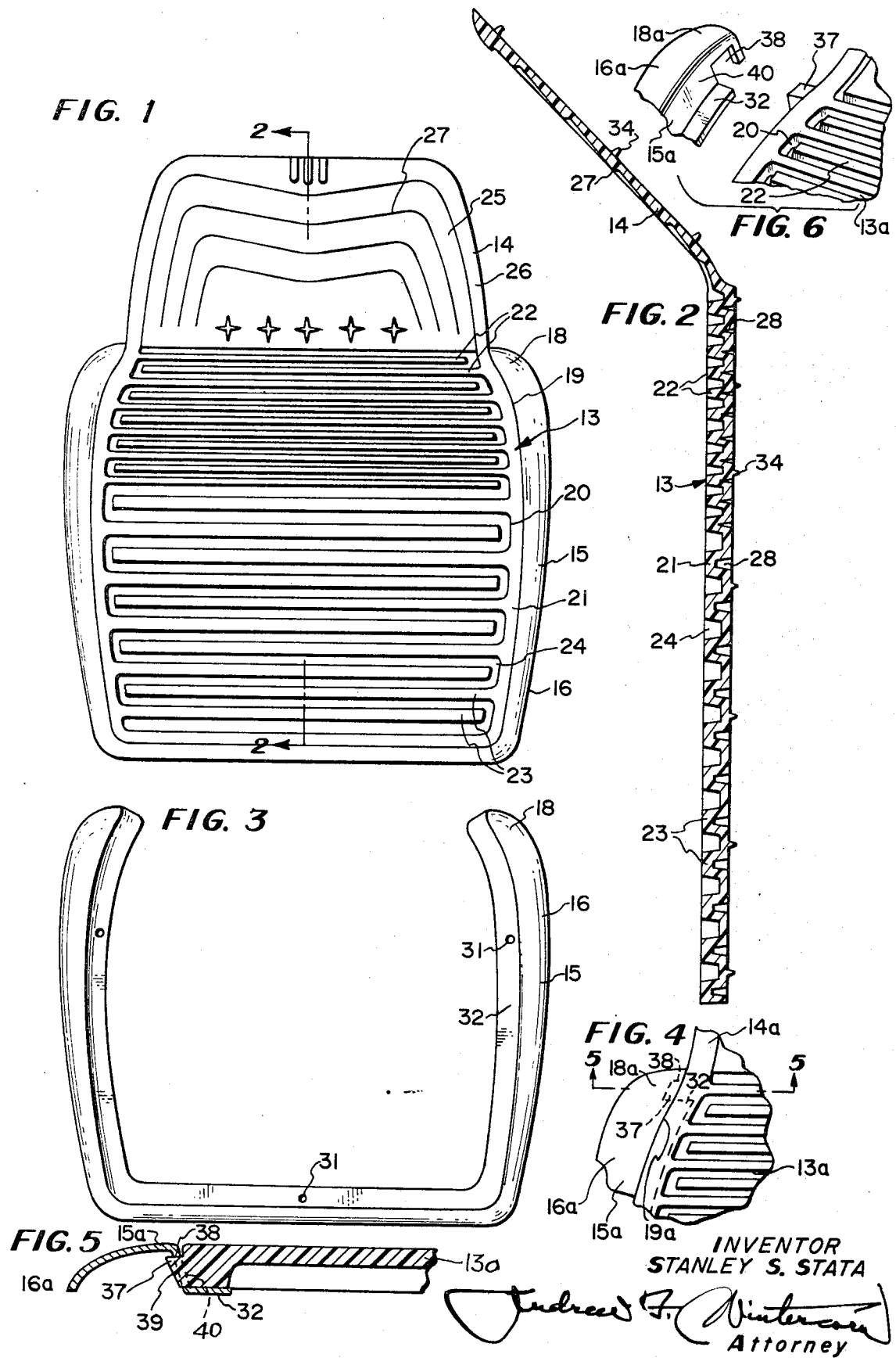

3,526,016
SHOE SCRAPER FLOOR MAT AND LOCATING FRAME COMBINATION FOR MOTOR VEHICLES
Stanley S. Stata, Rockford, Ill., assignor of forty-nine percent to Andrew F. Wintercorn, Rockford, Ill.
Filed Oct. 8, 1968, Ser. No. 765,817
Int. Cl. A47l 23/22
U.S. Cl. 15—216   17 Claims

ABSTRACT OF THE DISCLOSURE

A vehicle floor mat construction for a carpeted vehicle floor having a rigid generally U-shaped frame secured to the floor, and a mat of flexible material including a pan having a shoe scraper means therein whereby dirt and moisture scraped from shoes is retained in the pan, the arms of the U-shaped frame being curved inwardly at their forward ends and the mat having its lateral edges at the forward end also curved inwardly to conform to the frame so that the mat is retained in the frame against forward displacement although it is still removable from the frame to facilitate cleaning of the pan and scraper means. Interfitting projections and recesses on the forward end of the frame and mat insure keeping the top of the mat flush with the top of the frame even though the toeboard extension on the mat is flexed upwardly with respect to the mat to overlie the carpet on the toeboard portion of the floor.

---

This invention relates to a new and improved shoe scraper floor mat and locating frame combination for motor vehicles, designed for application over the carpet on the floors of said vehicles.

The principal object of my invention is to provide a floor mat of sufficient depth between the shoe scraping ribs thereof to collect moisture and dirt in the anticipated amount, the moisture being retained in the recesses between the ribs during evaporation while leaving the top surfaces of the ribs fairly dry, while the mat is designed to rest on top of the carpet on the floor of the vehicle and, although held securely enough to prevent displacement by reason of a novel configuration given the mat along its lateral edges at the front to conform with and be retained by the inward curvature at the front ends of the side portions of a U-shaped retaining frame, is nevertheless readily removable and replaceable, thus enabling thoroughly washing and drying the removed mat at intervals for neater appearance, vacuum cleaning of the mat between such cleanings serving to keep the mat always neat and attractive in appearance. In the case of the floor mats at the driver's position and the front passenger's position, the mat includes a thinner forwardly extending ribbed foot scraping toeboard portion on the front end thereof, flush with the top of the main body portion of the mat and adapted to be flexed upwardly to rest on the carpet of the toeboard, designed to drain freely into the main body portion of the pan defined in the mat, the locating frame in both those cases being devoid of any front cross-portion, and the mat in one form having laterally projecting lugs with inwardly inclined outer faces, those lugs being designed to be entered with a snap fit in openings provided therefor in the front end portions of the arms of the U-shaped frame, the inwardly inclined outer faces on the lugs having wedging engagement with the outwardly inclined inner sides of said arms to insure the lugs snapping into place in the openings when a certain amount of foot pressure is applied downwardly to the top of the mat at these points.

Another feature is to utilize instead of metallic locating frames that are fastened to the floor through the carpet as by means of screws or bolts, molded rubber or plastic frames adapted to be sewed or otherwise suitably secured to the carpet, these frames having longitudinally extending grooves in the bottom thereof for good gripping contact with the carpet, and having other longitudinal grooves in the top thereof to receive downwardly projecting ribs on the under side of the edge portions of the mat to insure good enough interconnection to reduce likelihood of any displacement of the mats from their correct position. Small conical projections on the bottoms of the mats in all forms are also arranged to be impressed into the carpet to further resist displacement of the mats from their set positions.

The invention is illustrated in the accompanying drawings, in which:

FIG. 1 is a plan view of a shoe scraper floor mat and locating frame combination made in accordance with my invention, the assembly shown being for the driver's and/or front passenger's position;

FIG. 2 is a longitudinal section through the mat on the line 2—2 of FIG. 1, on a larger scale;

FIG. 3 is a plan view of the locating frame shown in FIG. 1.

FIG. 4 is a detail of a portion of FIG. 1 showing a modified or alternative construction;

FIG. 5 is a section on the line 5—5 of FIG. 4;

FIG. 6 is an exploded perspective view of the parts seen in FIG. 4 to better illustrate the construction;

FIGS. 7 and 8 are plan views along the lines of FIGS. 1 and 3, respectively, showing a floor mat and locating frame combination designed for installation in front of the rear seat and indicating in dotted lines in FIG. 8 how the front cross-portion of the generally rectangular frame could be eliminated to provide a U-shaped frame similar to that of FIG. 3;

FIG. 9 is a longitudinal cross-section of the mat of FIG. 7 on an enlarged scale;

FIGS. 10 and 11 are sections similar to FIG. 5 showing two different ways of fastening the metallic locating frames to the floor of the vehicle through the carpet and underlying jute, and FIG. 12 is a similar section showing a molded rubber or plastic frame secured to the carpet by stitches and designed to have the mat and frame interfit in a novel manner.

Similar reference numerals are applied to corresponding parts throughout the views.

Referring first to FIGS. 1 to 3, 10 and 11, the reference numeral 13 designates a floor mat made in accordance with my invention, designed for use at either the driver's position, assuming there is free space under the brake and accelerator pedals for the toeboard extension 14, or at the front passenger's position. 15 designates the locating frame that may be of stamped sheet metal or die cast construction and has a downwardly and outwardly curved flange portion 16 integral with the top of the outer wall 17 of the generally L-shaped section of the frame inside which the mat 13 fits loosely enough to permit fairly easy removal and replacement of the mat whenever it is to be thoroughly washed to clean off any unsightly smears of dirt that might otherwise spoil the neat and attractive appearance of the ensemble. The frame 15 is generally U-shaped and has the front end portion 18 of the arms thereof curved inwardly toward each other, conforming to the inwardly curved lateral edges 19 of the mat, as clearly shown in FIG. 1, whereby to hold the mat securely against forward displacement regardless of the anticipated amount of shoe scraping action. The floor mat is preferably molded of rubber or plastic material and provides a fairly deep pan portion 20 in its main generally rectangular body portion 21, closely spaced parallel scraping ribs 22 being provided in the forward portion of the length of the mat and more widely spaced parallel scraping ribs 23 being provided in the remainder, all these ribs extending substantially the full depth of the pan but ending short of the sides thereof to leave a deep continuous recess 24 of zig-zag form from front to rear of the pan, providing enough space for the collection of the anticipated amount of moisture and dirt, all the moisture being retained in the pan during evaporation while leaving the top surfaces of the ribs 22 and 23 fairly dry. The toeboard extension 14, which is fairly thin in relation to the main body portion 21 of the mat and is molded integral with the front end thereof in coplanar relationship to the upper portion, and is flexible with respect thereto to overlie the toeboard, as indicated in FIG. 2, bias a recess 25 therein enclosed by the marginal edge portion 26 of the toeboard extension from which moisture and dirt is free to drain into the front end portion of the pan 20, shallow ribs 27 being defined on this toeboard portion for shoe scraping purposes. To conserve in the cost of production and also to make the mats lighter weight, all of the ribs 22 and 23 may be made hollow as indicated at 28 in FIG. 2. In passing, it will be seen in FIGS. 10 and 11 that the top of the pan portion 21 lies substantially flush with the top of the frame 15, thereby giving a nice trim appearance and at the same time allowing easy sweeping of dirt off the carpet C over the flange 16 and into the pan.

The frame 15 is adapted to be fastened to the sheet metal floor 29 of the motor vehicle by means of sheet metal screws 30 entered through holes 31 in the bottom wall or flange 32 of the frame as shown in FIG. 11, compressing the carpet C to a desired extent, as illustrated, in pressing the lower edge of flange 16 into the carpet so as to anchor the locating frame 15 quite securely so that it is entirely capable of performing its mat locating function. The flange 32 has its top substantially flush with the adjacent carpet and supports the marginal portion of the mat 13 substantially flush with the top of the frame, as shown in FIGS. 10 and 11. The material indicated at 33 in FIG. 11 is the usual jute interposed between the floor 29 and the carpet for cushioning and sound deadening purposes. Conical projections 34, which are molded integral with the bottom of the mat and its toeboard extension, serve by impression in the carpet C to hold the carpet in a set position and prevent its shifting about to any noticable extent, even under fairly heavy foot pressure, as when one is scraping dirt off the bottom of his shoes. If desired, bolts shown at 35 in FIG. 10 may be used in lieu of the screws 30, with nuts 36 tightenable on the bolts against the underside of the floor 29.

In operation, it should be clear from the foregoing description that, so long as the mat 13 is in place in the locating frame 15, the driver or the passenger, depending on which location is involved, can scrape off dirt and moisture from the bottom of his shoes into the pan 20, and then, if any dirt is left on the carpet around the mat and frame assembly, it can be swept nicely into the pan over the curved edges 16 of the frame. Having the mat level with the top of the frame, as shown in FIGS. 10 and 11, make it an easy matter to sweep the dirt into the pan. Whatever moisture is collected in the pan is allowed to evaporate, the top surfaces of the ribs 22 and 23 meanwhile remaining fairly dry. Vacuum cleaning of the mat from time to time will keep it clear of dirt, but if, for example, there are any unsightly smears of dirt that might not otherwise be easily removed, the mat can be removed from the frame for thoroughly washing it, the mat being raised out of the frame easily after lifting its toeboard extension 14. The inward curvature of the front end portions 18 of the arms of the U-shaped frame 15 prevents forward displacement of the mat from the frame, and it is clear that this pleasing curvature of the mat and frame to obtain the result mentioned enhances the appearance of the ensemble.

In FIGS. 4, 5 and 6 is illustrated a modified or alternative construction in which the mat 13a has on the sides of its front end portion, closely behind the toeboard, diametrically opposed outwardly projecting lugs 37 which are arranged to be snapped into notches 38 provided in the front end portions 18a of the arms 16a of the U-shaped frame 15a, the construction being otherwise the same as that shown in FIGS. 1–3. In other words, in addition to the inward curvature of the front end portions 18a of the arms of the U-shaped frame, which conform to the inward curvature of the side portions of the mat 13a as shown at 19a in FIG. 4, the lugs 37, which have inwardly inclined outer end faces 39 adapted to ride wedgingly on the outwardly slanting inside wall 40 of the frame when the mat is pressed down at these two corner portions, facilitate snapping of these lugs 37 into the notches 38, the securing bottom flange 32 on the frame terminating at these notches on both sides of the frame. Hence, there is no danger of the mat not staying flush with the top of the frame all the way to the point where the toeboard portion 14a is flexed upwardly relative to the rest of the mat to overlie the toeboard.

The generally rectangular mat 13b shown in FIG. 7 fitting inside metal frame 15b provides an assembly that is intended for use in front of the rear seat, and has parallel scraping ribs 23 defining a zig-zag channel or recess 24 similarly as in the mat 13. The frame 15b is adapted to be secured to the floor by screws 30 or bolts 35 entered in holes 31 provided in the bottom annular flange 32, the frame being of stamped sheet metal or die cast construction and the mats being molded of rubber or other plastic material similarly as in the other construction first described. However, the frame 15b need not be of complete rectangular form but may also be provided in the U-shaped design of frames 15, as indicated by the dotted lines at 40 in FIG. 8, to match the design of the frames used in front of the front seat in the other ensembles. In either event the mat 13b is removable from and replaceable in the frame.

The modified or alternative construction shown in FIG. 12 has a frame 15c of molded rubber or plastic material having a peripheral outer edge portion 41 of reduced thickness that is adapted to be sewed to the carpet C as shown by the stitching at 42. Here the mat 13c that is of plastic or rubber and has the same arrangement of ribs 23 as in the other forms molded integral therewith has around the marginal edge portion thereof downwardly projecting ribs 43 and 44 that fit in correspondingly shaped grooves 45 and 46, respectively, provided in the frame 15c. Here again, the mat 13c has its top surface substantially flush with the top of the frame 15c, as indicated at 47, facilitating the sweeping of dirt off the carpet C over the frame and into the pan 24 defined in the mat. The two thicknesses of the marginal edge portion of the mat complements the two thicknesses of the inner portion 48 of the frame in which the aforementioned grooves 45 and 46 are provided. The mat 13c is removable and replaceable in the frame. If desired, the frame and mat may both be molded of the same material and in the same or contrasting colors.

It is believed the foregoing description conveys a good understanding of the objects and advantages of my invention. The appended claims have been drawn to cover all legitimate modifications and adaptations.

I claim:

1. In a floor mat construction for vehicles, a substantially horizontal floor overlaid with carpet of compressible material, a generally U-shaped frame of relatively rigid material resting on the carpet, means rigidly securing said frame in place so as to be held against lateral displacement, said frame having downwardly inclined side portions to facilitate sweeping of dirt off the carpet around said frame over said frame, a floor mat of flexible material which includes a generally rectangular pan resting on the carpet inside and closely confined by said frame so as to fix the location of said mat on said floor, shoe scraper means provided in said pan, whereby dirt and moisture scraped from the bottom of shoes is retained in said pan for evaporation of the moisture while leaving the top of said scraper means fairly dry, the top of said pan lying substantially flush with the top of said frame to facilitate sweeping dirt from the carpet around said frame over said frame into said pan, the front end portions of the arms of said U-shaped frame being curved inwardly toward each other, and the side edges of the mat at the front being correspondingly shaped so that the inwardly curved arms of said frame serve to retain said mat against forward displacement of said mat relative to said frame.

2. A floor mat construction as set forth in claim 1, wherein said frame has a horizontal flange on the inner circumference which, when the frame is secured in place, is depressed into the carpet so that the top thereof is substantially flush with the adjacent carpet inside said frame, said flange supporting the outer marginal portions of said mat with the top thereof substantially flush with the top of said frame.

3. A floor mat construction as set forth in claim 1 wherein the shoe scraper means provided in said pan is in the form of integral ribs in spaced relation to one another and, at least at one end, in spaced relation to the sides of said pan, whereby moisture collected in said pan is substantially uniformly distributed to facilitate evaporation thereof.

4. A floor mat construction as set forth in claim 1 wherein said mat has a generally rectangular toeboard extension on the front end thereof between the front ends of the arms of said U-shaped frame, said extension being normally in coplanar relationship to the top of the rest of the mat but being flexible upwardly to overlie the carpet on the toeboard.

5. A floor mat construction as set forth in claim 1 wherein said mat has a generally rectangular toeboard extension on the front end thereof between the front ends of the arms of said U-shaped frame, said extension being normally in coplanar relationship to the top of the rest of the mat but being flexible upwardly to overlie the carpet on the toeboard, the toeboard extension having a generally rectangular recess provided therein communicating at the rear thereof with the front portion of said pan so as to drain into said pan.

6. A floor mat construction as set forth in claim 1 wherein said mat has a generally rectangular toeboard extension on the front end thereof between the front ends of the arms of said U-shaped frame, said extension being normally in coplanar relationship to the top of the rest of the mat but being flexible upwardly to overlie the carpet on the toeboard, the toeboard extension having a generally rectangular recess provided therein communicating at the rear thereof with the front portion of said pan so as to drain into said pan, and shoe scraper ribs integral with said toeboard extension in spaced relation to one another and to the sides of said recess, whereby moisture scraped off shoes on said ribs can drain from said recess into said pan.

7. A floor mat construction as set forth in claim 1 wherein said mat has a generally rectangular toeboard extension on the front end thereof between the front ends of the arms of said U-shaped frame, said extension being normally in coplanar relationship to the top of the rest of the mat but being flexible upwardly to overlie the carpet on the toeboard, said mat having laterally extending projections on opposite sides thereof behind said toeboard extension, and the arms of said frame having registering openings provided therein on the inner side to receive said projections to interlock said mat with said frame at these points.

8. A floor mat construction as set forth in claim 1 wherein said mat has a generally rectangular toeboard extension on the front end thereof between the front ends of the arms of said U-shaped frame, said extension being normally in coplanar relationship to the top of the rest of the mat but being flexible upwardly to overlie the carpet on the toeboard, said mat having laterally extending projections on opposite sides thereof behind said toeboard extension, and the arms of said frame having registering openings provided therein on the inner side to receive said projections to interlock said mat with said frame at these points, the outer ends of said projections being substantially flat but inclined inwardly to define cam surfaces for wedging engagement with said frame over said openings, said projections being of compressible resilient material, whereby when downward pressure is applied on said mat in the vicinity of said projections with the projections in register with said openings in said frame said projections are adapted to be snapped into place into said openings.

9. A floor mat construction as set forth in claim 1, wherein said mat has laterally extending projections on opposite sides thereof at the front end portion, and the arms of said frame having registering openings provided therein on the inner side to receive said projections to interlock said mat with said frame at these points.

10. A floor mat construction as set forth in claim 1, wherein said mat has laterally extending projection on opposite sides thereof at the front end portion, and the arms of said frame having registering openings provided therein on the inner side to receive said projections to interlock said mat with said frame at these points, the outer ends of said projections being substantially flat but inclined inwardly to define cam surfaces for wedging engagement with said frame over said openings, said projections being of compressible resilient material, whereby when downward pressure is applied on said mat in the vicinity of said projections with the projections in register with said openings in said frame said projections are adapted to be snapped into place into said openings.

11. A floor mat construction as set forth in claim 1, wherein there are interfitting projections and recesses provided on said frame and mat at the front end to further secure the mat against displacement relative to said frame.

12. A floor mat construction as set forth in claim 4, wherein there are interfitting projections and recesses provided on said frame and mat at the front end adjacent the rear end of said toeboard extension to further secure the mat against displacement relative to said frame.

13. A floor mat construction as set forth in claim 1, wherein there are interfitting projections and recesses provided on said frame and mat at the front end to further secure the mat against displacement relative to said frame, said projections being formed relative to said recesses for snap-in engagement into said recesses when the projections and recesses are in register and downward pressure is applied on top of the mat.

14. A floor mat construction as set forth in claim 4, wherein there are interfitting projections and recesses provided on said frame and mat at the front end adjacent the rear end of said toeboard extension to further secure the mat against displacement relative to said frame, said projections being formed relative to said recesses for snap-on engagement into said recesses when the projections and recesses are in register and downward pressure is applied on top of the mat.

15. A floor mat construction as set forth in claim 1, wherein said frame has a flat thin marginal edge portion horizontally overlying the carpet and secured to said carpet.

16. A floor mat construction as set forth in claim 1, wherein the top of the inner marginal portions of said frame and the bottom of the outer marginal portions of said mat have interfitting ridges and grooves to resist displacement of said mat relative to said frame.

17. A floor mat construction as set forth in claim 1, wherein the bottom of said mat has substantially conical projections which are adapted to be impressed into the carpet to resist displacement of any portions of said mat from a set position.

References Cited

UNITED STATES PATENTS

| | | |
|---|---|---|
| 1,411,469 | 4/1922 | Bassett. |
| 1,595,710 | 8/1926 | Cocks. |
| 1,698,005 | 1/1929 | Stanwood. |
| 2,843,870 | 7/1958 | Perry. |
| 3,082,032 | 3/1963 | Stata. |
| 3,312,497 | 4/1967 | Stata. |
| 3,387,315 | 6/1968 | Stata. |
| 3,390,912 | 7/1968 | Stata. |
| 3,424,265 | 1/1969 | Stata. |
| 3,450,429 | 6/1969 | Stata. |

FOREIGN PATENTS

| | | |
|---|---|---|
| 370,231 | 4/1932 | Great Britain. |
| 725,551 | 1/1955 | Great Britain. |
| 801,540 | 5/1936 | France. |
| 870,167 | 3/1953 | Germany. |
| 867,068 | 2/1953 | Germany. |
| 800,030 | 8/1950 | Germany. |
| 387,273 | 2/1933 | Great Britain. |
| 601,213 | 6/1960 | Italy. |

WALTER A. SCHEEL, Primary Examiner

L. G. MACHLIN, Assistant Examiner